United States Patent [19]

Ma

[11] Patent Number: 5,290,178

[45] Date of Patent: Mar. 1, 1994

[54] DOCKING STATION APPARATUS FOR PORTABLE COMPUTER

[76] Inventor: Hsi K. Ma, 4F., No. 48, Sec. 2 Chung Cherng Rd., Taipei, Taiwan

[21] Appl. No.: 77,492

[22] Filed: Jun. 17, 1993

Related U.S. Application Data

[63] Continuation of Ser. No. 848,197, Mar. 10, 1992, abandoned.

[51] Int. Cl.$^5$ .......................................... H01R 25/00
[52] U.S. Cl. .................................... 439/652; 439/378
[58] Field of Search ............... 439/638, 640, 650–654, 439/630–637, 928, 924; 361/391, 413–415

[56] References Cited

U.S. PATENT DOCUMENTS

| | | | |
|---|---|---|---|
| 4,530,066 | 7/1985 | Ohwaki et al. | 439/928 |
| 4,850,899 | 7/1989 | Maynard | 439/638 |
| 5,011,436 | 4/1991 | Waters | 439/78 |
| 5,030,128 | 7/1991 | Herron et al. | 439/639 |

FOREIGN PATENT DOCUMENTS

| | | | |
|---|---|---|---|
| 8808662 | 11/1988 | PCT Int'l Appl. | 439/928 |
| 2115989 | 9/1983 | United Kingdom | 439/638 |

*Primary Examiner*—David L. Pirlot
*Attorney, Agent, or Firm*—Bacon & Thomas

[57] ABSTRACT

A docking apparatus for connecting a portable computer to an expansion device, comprises an elongated flat bar having two unitary stop bars at two opposite ends thereof at right angles for holding a portable computer therebetween. The stop bars have dowels on back faces thereof respectively fastened in holes on an expansion device for positioning, the flat bar relative to the expansion device. The elongated flat bar has two output terminals on a back face thereof respectively connected to two input terminals on the expansion device, and a plurality of input terminals electrically connected to the output terminals for connecting the output terminals of a portable computer to the flat bar.

1 Claim, 2 Drawing Sheets

DOCKING STATION APPARATUS FOR PORTABLE COMPUTER

This application is a continuation of application Ser. No. 07/848,197, filed Mar. 10, 1992, now abandoned.

BACKGROUND OF THE INVENTION

The present invention relates to a docking station apparatus, and more particularly, the present invention relates to a docking station apparatus for connecting an unmatched portable computer to an expansion device.

Various portable computers are known and in use for the advantages of mobility. However, a portable computer is still no match for a desk-top computer in functions. In order to increase the functions of a portable computer, expansion apparatus may be used. For example, the "Portable Note-Book Computer Expansion Device" as disclosed in U.S. patent application Ser. No. 696,758, now approved, was designed for this purpose. Because an expansion device is to be used in connecting a specific apparatus to a specific model of computer, its usage is limited.

SUMMARY OF THE INVENTION

The present invention has been accomplished under the aforesaid circumstances. It is therefore the main object of the present invention to provide a docking station apparatus for a portable computer which permits an unmatched portable computer to be connected to an expansion device. It is another object of the present invention to provide a docking station apparatus for connecting a portable computer to an expansion device, which is inexpensive to manufacture. According to the present invention, a docking station apparatus, which is to be secured to an expansion device through a dowel joint, is generally comprised of an elongated flat bar having two stop bars at two opposite ends thereof at right angles for holding a portable computer therebetween. The elongated flat bar has two output terminals on the back side thereof for connecting to the two input terminals of an expansion device, and a plurality of input terminals on the front side thereof for electrically connecting the output terminals of a specific portable computer to the expansion device.

DETAILED DESCRIPTION OF THE PREFERRED EMBODIMENT

Figure 1:
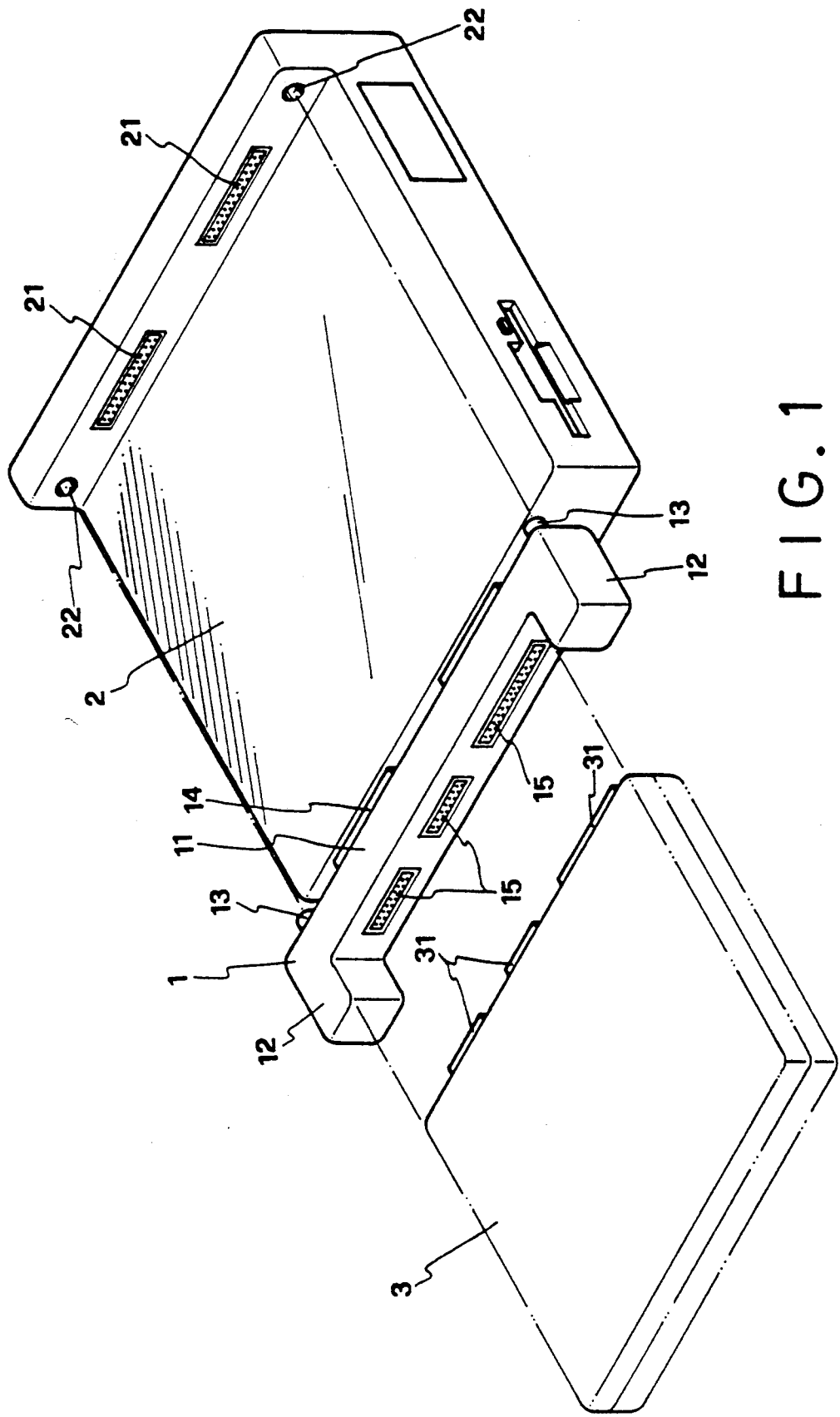
FIG. 1 is an exploded view of the preferred embodiment of the docking station apparatus of the present invention.
Figure 2:
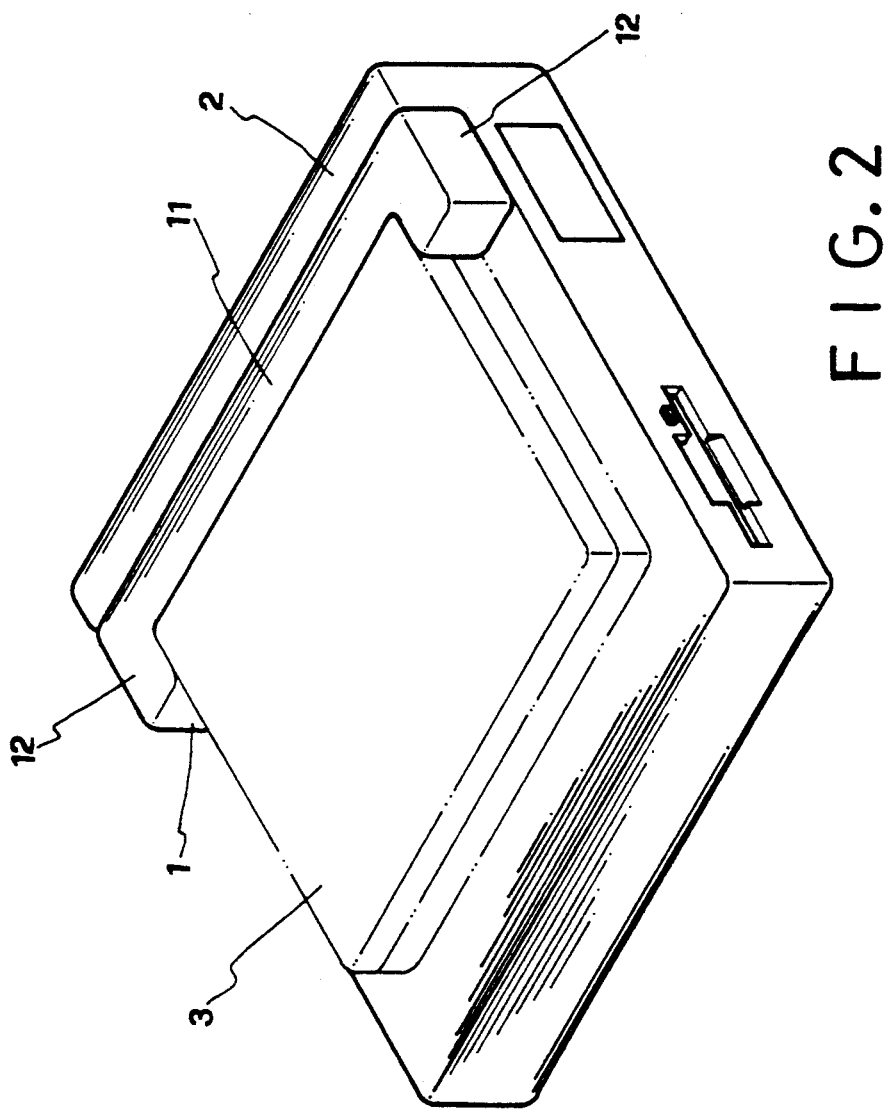
FIG. 2 is an elevational view thereof.

Turning now to the annexed drawings in detail, therein illustrated is a docking station apparatus 1 embodying the present invention, which is to be used with an expansion device 2 and a portable computer 3.

The expansion device 2 is of the known art having floppy disk drive, hard disk drive and expansion slots. Further, the expansion device 2 must have two input terminals 21 for connecting the output terminals 31 of the portable computer 3.

The docking station apparatus 1 is comprised of an elongated flat bar 11 having two unitary stop bars 12 at two opposite ends thereof at right angles. The two stop bars 12 extend at right angles in the same direction, and the distance between the two stop bars 12 is designed according to the size of the portable computer 3 to be connected. The docking station apparatus 1 further comprises two dowels 13 on the back side of the stop bars 12. By inserting the two dowels 13 in two holes 22 on the expansion device 2, the docking station apparatus 1 is firmly secured to the expansion device 2. Two spaced, discrete socket units or output terminals 14 are made on the back side of the elongated flat bar 11 of the docking station apparatus 1, which can be electrically connected to the input terminals 21 of the expansion device 2 when the dowels 13 are respectively inserted in the holes 22. A plurality of spaced, discrete socket units or input terminals 15 are made on the front side of the elongated flat bar 11 of the docking station apparatus 1 and electrically connected to the output terminals 14 for connecting the output terminals 31 of the portable computer 3. Therefore, by means of the docking station apparatus 1, the portable computer 3 can be electrically connected to the expansion device 2 so as to increase its functions.

Because an expansion device has fixed input terminals, and different model of portable computer has different output terminals, an expansion device is only suitable for connecting a portable computer of specific model. However, when a suitable docking station apparatus is provided, any different model of portable computer can be connected to a common expansion device. Because a docking station apparatus is inexpensive to manufacture, every portable computer can be provided with a specific docking station apparatus for connecting to any expansion device.

The aforesaid embodiment is simple in structure and functional. However, it will be obvious to those skilled in the art that various changes may be made without departing from the scope of the invention and the invention is not to be considered limited to what is shown in the drawings and the described in the specification.

What is claimed is:

1. A docking apparatus for electrically connecting a plurality of output terminals of a portable computer to a plurality of input terminals of an expansion device, said docking apparatus comprising:
   an elongated flat bar having first and second ends, a front face and a rear face;
   first and second stop bars each having an associated back face, said stop bars being integrally formed with said flat bar and extending substantially perpendicular to said first and second ends of said flat bar respectively;
   a dowel member extending from each of said stop bars substantially perpendicular to said back faces;
   a pair of spaced, discrete plug units projecting from one of said front and rear faces of said flat bar for electrically connecting the docking apparatus to an expansion device; and
   a plurality spaced, discrete socket units recessed within the other of said front and rear faces of said flat bar for electrically connecting a portable computer to the docking apparatus.

* * * * *